UNITED STATES PATENT OFFICE.

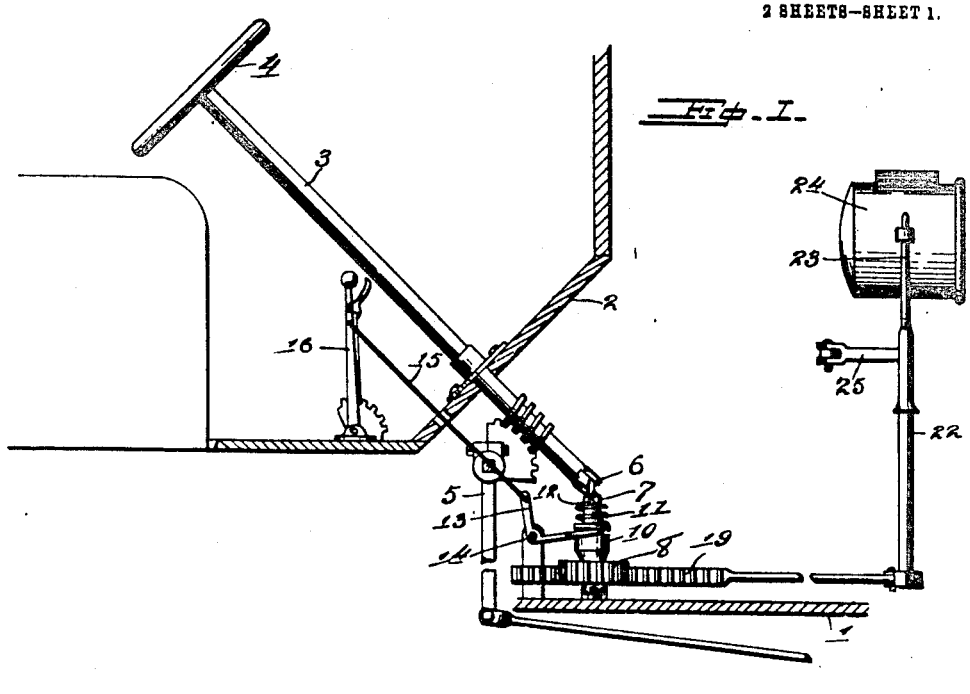
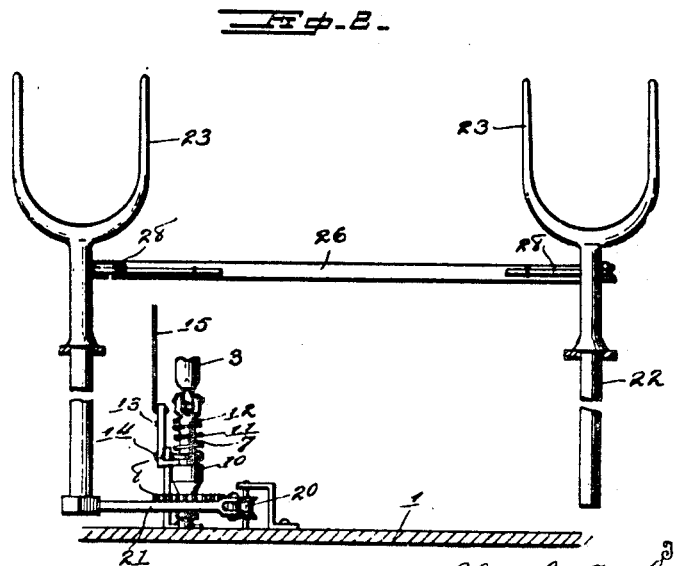

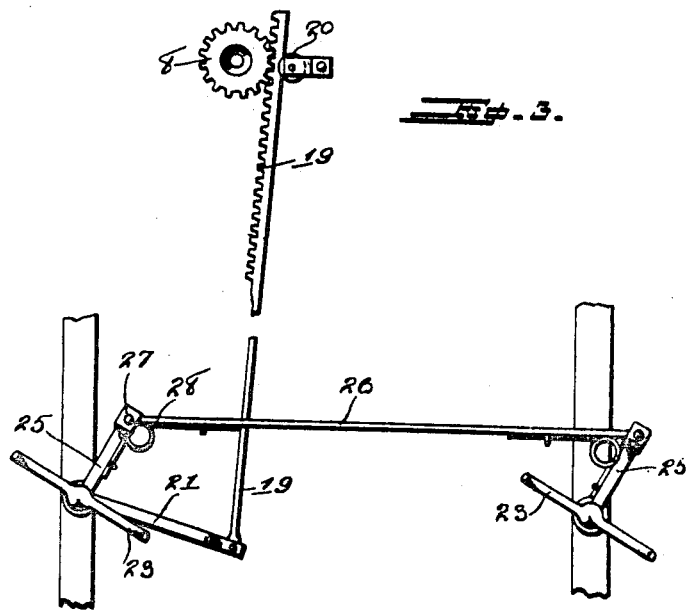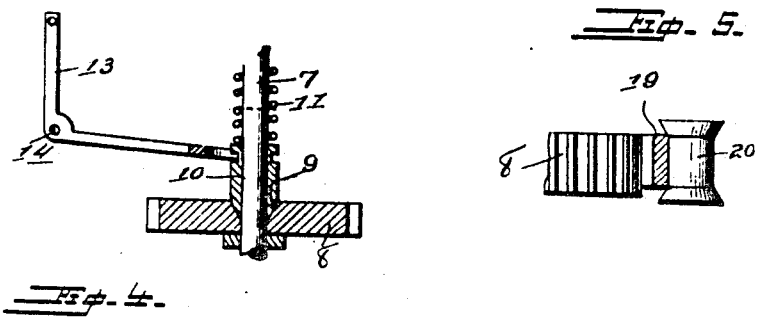

HUGH A. SISSON, OF RED BLUFF, CALIFORNIA.

PIVOT-LIGHT FOR AUTOMOBILES.

1,134,644.

Specification of Letters Patent.

Patented Apr. 6, 1915.

Application filed July 8, 1914. Serial No. 849,224.

*To all whom it may concern:*

Be it known that I, HUGH A. SISSON, a citizen of the United States, residing at Red Bluff, in the county of Tehama and State of California, have invented certain new and useful Improvements in Pivot-Lights for Automobiles, of which the following is a specification.

My invention relates to lamps for road vehicles, and pertains especially to a pivotally mounted light which will turn laterally in unison with the steering wheels of the vehicle.

The object of the invention is to provide means whereby a pivotally mounted lamp or light will turn in unison with the front wheels of the vehicle so that the rays of the lamp will be cast always along the road directly in the line of travel and irrespective of the sinuosity of the path traversed by the vehicle.

A further object of the invention is to provide means by which the lamp can be uncoupled from the steering mechanism at any time and be held in fixed position.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Figure 1 is a side elevation of a portion of a vehicle frame, parts being shown in section, illustrating the application of the invention; Fig. 2 is a front elevation of the operating means shown in Fig. 1; Fig. 3 is a top plan view of the device as illustrated in Fig. 2, parts having been removed; Fig. 4 is a fragmentary view illustrating the actuating means for the cone clutch; and Fig. 5 is a similar view showing the detail construction of the guide means for the rack bar.

Before proceeding with the description of the drawings, I desire to call particular attention to the fact that while I have evolved my invention with reference to its application in connection with a road vehicle such as an automobile, the same may be readily utilized for the purpose specified as a light operating means for conveyances varying in type.

Referring now to the drawings by numerals, 1 designates the body or chassis of an automobile, 2 the dash board, 3 the steering post, 4 the steering wheel and 5 the steering mechanism, only a part of which is shown.

The above is shown, only for the purpose of illustrating the application of the invention, the same forming no part of the mechanism comprising the present device.

Steering post 3 is connected by a universal joint 6 to a stub shaft 7, the latter extending at an obtuse angle to the said post 3, said shaft 7 being journaled in a bearing therefor mounted upon the chassis 1. Loose upon shaft 7 and held against longitudinal movement relatively thereof, is a gear wheel 8, one face of which is provided with a conical recess 9, the latter being formed concentrically relatively to the axis of rotation of the wheel to receive, when shifted, the contacting surface of a friction cone clutch member 10. Said member 10 is mounted for sliding movement upon shaft 7, the said member, when in engagement with the contacting surface of the recess 9 causing motion to be transmitted to gear 8 from shaft 7, the latter being actuatable, as is apparent, through a turning of steering post 3 and steering wheel 4.

As a means whereby the cone clutch member 10 may be held out of engagement with gear wheel 8, and against tension of a spring 11 abutting at one end a pin 12 rigid with the shaft 7 and at its opposite end the top of the said clutch, I provide a bell crank 13, this bell crank being fulcrumed as at 14 and connected by means of a rod 15 to an operating lever 16, the latter having associated therewith a segment 17 engaged by a pawl 18 actuatable to lock the lever against movement when so desired. Upon disengagement of said pawl 18 from the segment 17, tension of spring 11 is sufficient to move or slide clutch member 10, the same being adapted for frictional engagement with the wall of recess 9 to in this manner rotate the gear 8 according to the rotation of the steering post 3.

A rack bar 19, engageable with gear wheel 8 is held in such engagement through the medium of a spool or roller 20 against which the smooth face or side of the rack bar rests, the spool being mounted in any suitable manner to serve as a guide therefor. Rack bar 19 is pivoted at its forward end as at 20 to an arm 21 the latter being rigid at its opposite end with one of the upright lamp supporting brackets designated 22. Lamp brackets 22 being the same in construction, the reference numerals mentioned in the description relating to one, will be applied to the drawings as referring to both. Said bracket 22 is provided with a forked or bifurcated extension 23 at its upper end, the light or lamp 24 fitting the bifurcation.

As a means whereby the lamp may be moved in unison, I provide arms 25 extending, one from each of the respective brackets 22, the arms being connected by a rod 26 pivoted as at 27 to each of the respective arms. Adjacent the pivot point 27 is mounted a coil spring 28, the extremities of which are extended, one extremity parallel with the rod 26 and the opposite extremity parallel with the extension 25, suitable means carried by the respective elements 25 and 26, holding the said extremities in sliding engagement therewith. By the provision of the coil springs 28, it is apparent that the brackets 22, when the cone clutch member 10 is withdrawn from engagement from gear 8, will automatically, swing the lamp or light into a position whereby the light rays will be cast in a line directly ahead of the vehicle body, irrespective of the position of the steering wheels.

When traveling at night, lever 16 is actuated by disengagement of pawl 18 with the segment 17, causing bell crank 13 to move, by the tension of spring 11, the cone clutch member 10 into frictional engagement with the recess therefor in gear wheel 8. When thus engaged, a turning of the steering post 3 by operation of the steering wheel 4, will cause said wheel to be turned simultaneously or in unison with the turning of the front wheels of the vehicle. As wheel 8 is turned, rack bar 19 is shifted or moved causing arm 21 to be actuated and one of the lamp supporting brackets 22 to be turned. The brackets being connected as above described, it is apparent that both brackets will be moved in unison and against tension of spring 28.

When it is desired that the lamp shifting mechanism be rendered inoperative, lever 16 is moved into the position indicated in Fig. 1 to withdraw cone clutch member 10 from engagement with gear wheel 8 and against tension of spring 11, pawl 18 holding said lever when so adjusted. As cone clutch member 10 is withdrawn, springs 28 will automatically return the lamps 24 to their normal position, this being made possible by the arrangement of the said springs 28 relatively to the extensions 25 and connecting rod 26, the extremities of the respective springs being set to normally extend at right angles to each other and parallel with the extensions 25 and rod 26 as above described. Gear wheel 8 being loose upon shaft 7, it is apparent that rack bar 19 may be freely moved.

From the foregoing, taken in connection with the accompanying drawings it will be noted that the device may be rendered operative or inoperative as desired; that means has been provided whereby the lights will be automatically returned to their normal position immediately upon adjustment of lever 16 to render the device inoperative; and that by providing mechanism as above set forth, the entire light operating means, when operative, is controlled through manipulation of steering wheel 4 and steering post 3.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. Headlight operating mechanism including a bracket turnable relatively to the conveyance upon which it is arranged, a shaft connected to the steering mechanism of the said conveyance, an element loose upon said shaft, means to turn the bracket according to the rotation of said element, and means slidable relatively to the element, said means being movable upon the shaft into and out of engagement with the element to render it operative or inoperative for the purpose specified.

2. In combination with a lamp bracket turnable relatively to the conveyance upon which it is arranged, a shaft, a gear loose upon said shaft, a rack bar engageable with said gear and connected to said bracket for turning the latter according to the rotation of said gear, and means slidable relatively to the gear, said means being movable upon said shaft into and out of engagement with the gear to render it operative or inoperative.

3. In combination with a lamp bracket turnable relatively to the conveyance upon which it is arranged, a shaft connected to the steering mechanism of the said conveyance, a gear loose upon said shaft, a rack bar engageable with said gear and connected to said bracket for turning the latter according to the rotation of said gear, and means including a friction cone clutch slidable relatively to the gear, said cone clutch being movable upon the shaft into and out of engagement with the gear to render the gear operative or inoperative, as and for the purpose set forth.

4. In combination with a lamp bracket turnable relatively to the conveyance upon which it is arranged, a shaft connected to the steering mechanism of the said conveyance, a gear loose upon said shaft, a rack bar engageable with said gear and connected to said bracket, a friction cone clutch slidable upon said shaft into and out of engagement with said gear, and means actuatable to slide said clutch to render the bracket actuating mechanism operative or inoperative, as and for the purpose set forth.

5. In combination with a lamp bracket turnable relatively to the conveyance upon which it is arranged, a shaft having universal connection with the steering mechanism of the said conveyance, a gear wheel loose upon said shaft, a rack bar engageable with said wheel and connected to said bracket, means engageable with said rack bar for holding the same in mesh with the gear, a spring actuated friction cone clutch slidable upon said shaft, and means including an operating lever actuatable to move said clutch into and out of frictional engagement with said wheel to render the bracket actuating means operative or inoperative, as and for the purpose set forth.

6. In combination with lamp brackets turnable relatively to the conveyance upon which they are arranged, means connecting the brackets for moving the brackets in unison, a shaft operable through manipulation of the steering mechanism of the conveyance, a gear loose upon said shaft, a rack bar engageable with said gear and connected to one of said brackets for imparting motion thereto, and means including a friction cone clutch slidable upon said shaft into and out of frictional engagement with said wheel to render the brackets operative or inoperative, as and for the purpose set forth.

7. In combination with a lamp bracket turnable relatively to the conveyance upon which it is arranged, a member connected to the steering mechanism of the said conveyance, an element loose upon said member, a bar engageable with said element and connected to said bracket for turning the latter according to the rotation of said element, and means slidable relatively to the element, said means being movable upon said member into and out of engagement with said element to render it inoperative or operative, as and for the purpose set forth.

In testimony whereof I affix my signature in presence of two witnesses.

HUGH A. SISSON.

Witnesses:
L. F. CARTER,
J. F. SISSON.